(12) United States Patent
Kawaguchi et al.

(10) Patent No.: US 6,747,919 B2
(45) Date of Patent: Jun. 8, 2004

(54) MAGNETO-OPTICAL RECORDING MEDIUM, AND METHOD AND APPARATUS FOR PRODUCING THE SAME

(75) Inventors: Yuuko Kawaguchi, Ibaraki (JP);
Motoyoshi Murakami, Hirakata (JP);
Masahiro Birukawa, Hirakata (JP);
Tsutomu Shiratori, Tokyo (JP);
Yasuyuki Miyaoka, Yokohama (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 10/125,659

(22) Filed: Apr. 18, 2002

(65) Prior Publication Data

US 2002/0196712 A1 Dec. 26, 2002

(30) Foreign Application Priority Data

Apr. 19, 2001 (JP) ......................................... 2001-120688

(51) Int. Cl.$^7$ .............................. G11B 11/00; G11B 5/66
(52) U.S. Cl. ............................... 369/13.47; 369/13.52; 428/64.3; 428/694 ML
(58) Field of Search .................... 369/13.47, 13.52, 369/13.42, 13.41, 116, 13.44, 13.02, 13.06; 428/694 EC, 694 MM, 694 ML, 900, 64.3, 64.4

(56) References Cited

U.S. PATENT DOCUMENTS

| | | | | |
|---|---|---|---|---|
| 5,966,348 | A | | 10/1999 | Hashimoto et al. ...... 369/13.47 |
| 6,027,825 | A | | 2/2000 | Shiratori et al. ...... 428/694 ML |
| 6,345,016 | B1 | * | 2/2002 | Shiratori ................... 369/13.54 |
| 6,399,174 | B1 | * | 6/2002 | Shiratori et al. ........... 428/64.3 |
| 6,403,148 | B1 | * | 6/2002 | Shiratori et al. ............ 427/128 |
| 6,403,205 | B1 | * | 6/2002 | Shiratori ..................... 428/212 |

FOREIGN PATENT DOCUMENTS

| | | |
|---|---|---|
| JP | 6-290496 | 10/1994 |
| JP | 8-147777 | 6/1996 |
| JP | 10-91938 | 4/1998 |
| JP | 11-126381 | 5/1999 |
| JP | 11-126386 | 5/1999 |

* cited by examiner

*Primary Examiner*—Ali Neyzari
(74) *Attorney, Agent, or Firm*—Merchant & Gould P.C.

(57) ABSTRACT

By irradiating a light beam between recording tracks of the magneto-optical recording medium, the magnetic anisotropy of at least one layer selected from the group consisting of the domain wall displacement layer and the recording layer formed between the recording tracks can be made lower than that of said layers on the recording tracks, and a bias magnetic field is applied at least between recording tracks while a light beam is radiated. Because of this, initialization of a medium may be conducted simultaneously.

20 Claims, 11 Drawing Sheets

Domain wall displacement direction

MAGNETO-OPTICAL RECORDING MEDIUM, AND METHOD AND APPARATUS FOR PRODUCING THE SAME

BACKGROUND OF THE INVENTION

1. Field of the Invention

The present invention relates to a magneto-optical recording medium used for recording or reproducing information, a method for producing the same, and an apparatus for producing the same.

2. Description of the Related Art

As a repeatedly rewritable recording medium having a high density, a magneto-optical recording medium and a recording/reproducing apparatus for recording a minute domain onto a magnetic thin film with thermal energy of laser light, and reproducing a signal using a magneto-optical effect are being developed actively. In such a magneto-optical recording medium, when the diameter and interval of recording bits (domains for recording) become smaller with respect to the diameter of a light beam focused onto the medium, reproduction characteristics are degraded. This is caused as follows: an adjacent recording bit enters the diameter of a light beam focused onto an intended recording bit, which makes it difficult to reproduce information from individual recording bits separately.

In order to solve the above-mentioned problem, attempts have been made to enhance a recording density by modifying the configuration of a recording medium and a reproducing method. For example, a super-resolution system, a domain wall displacement detection (DWDD) reproducing system using the displacement of a domain wall, and the like have been proposed. Herein, a DWDD reproducing system disclosed in JP6(1997)-290496 A will be described with reference to FIG. 9.

In a magneto-optical recording medium shown in FIG. 9, a reproducing layer (domain wall displacement layer) 91, an intermediate layer (switching layer) 92, and a recording layer 93 that constitute magnetic layers 90 are exchange-coupled to each other, and a minute recording domain of the recording layer 93 is enlarged in the reproducing layer 91, whereby an amplitude of a reproducing signal is increased, making it possible to conduct high-density recording. Arrows represent the sublattice magnetization directions of transition metal in each layer. In each layer, a domain wall 94 is formed between domains in which magnetization directions are opposite to each other. A region 95 of the intermediate layer 92 reaches a temperature equal to or higher than a Curie temperature due to the irradiation with laser light for reproduction, whereby a magnetic order is lost.

The conditions desired for the above-mentioned magneto-optical recording medium are summarized by the following four points:

(1) The magneto-optical recording medium has the recording layer 93 that holds minute domains stably in a range from a room temperature to a reproducing temperature.

(2) Even when the magneto-optical recording medium is heated to the vicinity of a Curie temperature of the intermediate layer 92, the reproducing layer 91, the intermediate layer 92, and the recording layer 93 are exchange-coupled to each other.

(3) When the intermediate layer 92 reaches a temperature exceeding its Curie temperature so as to lose its magnetic order, exchange coupling between the recording layer 93 and the reproducing layer 91 is cut off.

(4) The domain wall coercive force of the reproducing layer 91 is small, and a domain wall energy gradient is caused by a temperature gradient. Therefore, in a region of the reproducing layer 91 where exchange coupling is cut off by the intermediate layer 92, the domain wall 94 is displaced from a position transferred from a domain of the recording layer 93. As a result, the magnetization in this region is aligned in the same direction, and an interval (recording mark length) between the magnetic walls 94 of the recording layer 93 is enlarged.

In FIG. 9, when the magneto-optical recording medium is moved (rotated in the case of a disk) in the right direction on the drawing surface while laser light is radiated thereto, due to the high linear velocity of the medium, the position at which a film temperature becomes maximum is placed on the backward side from the center of a beam spot in a traveling direction (left direction on the drawing surface) thereof. A domain wall energy density $\sigma_1$ in the reproducing layer 91 generally decreases with an increase in temperature to become 0 at a temperature equal to or higher than a Curie temperature. Therefore, in the presence of a temperature gradient, the domain wall energy density $\sigma_1$ is decreased toward a higher temperature side.

Herein, a force $F_1$ represented by the following expression acts on a domain wall present at a position "x" in a medium movement direction (circumferential direction of a disk).

$$F_1 \infty - d\sigma_1/dx$$

The force $F_1$ acts so as to displace a domain wall in a direction of lower domain wall energy. In the reproducing layer 91, a domain wall coercive force is smaller and a domain wall mobility is larger compared with those of the other magnetic layers. Therefore, when exchange coupling from the intermediate layer 92 is cut off, a domain wall is displaced very rapidly in a direction of lower domain wall energy due to the force $F_1$.

Referring to FIG. 9, in a region of the medium before being irradiated with laser light (e.g., a region at a room temperature), three magnetic layers are exchange-coupled to each other, and domains recorded in the recording layer 93 are transferred to the reproducing layer 91. In this state, the domain walls 94 are present between domains having magnetization directions opposite to each other in each layer. In the region 95 that reaches a temperature equal to or higher than the Curie temperature of the intermediate layer 92 due to the irradiation with laser light, magnetization of the intermediate layer 92 is lost, and the exchange coupling between the reproducing layer 91 and the recording layer 93 is cut off. Therefore, a force for holding a domain wall is lost in the reproducing layer 91, and a domain wall is displaced to a higher temperature side due to the force $F_1$ applied to the domain wall. At this time, a domain wall displacement speed is sufficiently higher than that of the medium movement speed. Thus, a domain larger than a domain stored in the recording layer 93 is transferred to the reproducing layer 91.

In a magneto-optical recording medium using the DWDD reproducing system, for the purpose of displacing a domain wall easily, the following is proposed: guide grooves having a rectangular cross-section are formed on a substrate so that domain walls are not generated on the side of the recording tracks, whereby the respective tracks are separated by the grooves. However, even if guide grooves having a rectangular cross-section are formed, films actually are accumulated to some degree in stepped portions, and magnetic layers are connected to each other. As a result, magnetic separation cannot be conducted completely, which inhibits the displacement of a domain wall.

SUMMARY OF THE INVENTION

The magneto-optical recording medium of the present invention includes a substrate and a multi-layer film formed on the substrate, the multi-layer film including a first dielectric layer, a domain wall displacement layer, a switching layer, a recording layer, and a second dielectric layer in this order from the substrate side, a Curie temperature of the switching layer being lower than those of the domain wall displacement layer and the recording layer, a domain wall in the domain wall displacement layer being displaced to a higher temperature side in a region that reaches a temperature equal to or higher than a Curie temperature of the switching layer due to irradiation with a light beam for reproduction. In the magneto-optical recording medium of the present invention, the magnetic anisotropy of at least one layer selected from the group consisting of the domain wall displacement layer and the recording layer formed between recording tracks is made lower than that of said layers on the recording tracks, and magnetization of at least one magnetic layer selected from the group consisting of the domain wall displacement layer, the switching layer, and the recording layer is aligned in a predetermined direction in a region that is a half or more of a track width in a track width direction in at least a part of the recording tracks.

In the above-mentioned magneto-optical recording medium, it is preferable that magnetization of at least the recording layer is aligned in the predetermined direction.

Furthermore, it is preferable that magnetization is aligned perpendicularly to a film surface on the recording tracks, and that magnetization is aligned in parallel with a film surface (in a film surface direction) between the recording tracks. When magnetization is aligned in a film surface direction between the recording tracks, a domain wall displacement speed on the recording tracks can be increased. It further is preferable that magnetization is aligned in an extension direction of the recording tracks therebetween. In such an alignment, a leakage magnetic field in a radial direction can be decreased, and a shielding effect between the recording tracks can be increased.

In the above-mentioned magneto-optical recording medium, magnetization may be aligned in the predetermined direction on all the recording tracks, and alignment directions of magnetization on the recording tracks may be varied depending upon the recording tracks. In the latter case, it is preferable that the alignment directions are reversed at each track (at each recording track), or that the alignment directions are reversed at every other recording track. This is because an influence of a leakage magnetic field further is reduced.

Although not particularly limited, when the present invention is applied to a magneto-optical recording medium in which a pit and a groove are embossed on a substrate, and a track pitch of the recording tracks is 0.9 µm or less, satisfactory results are obtained. Furthermore, the present invention is suitable for a magneto-optical recording medium in which the recording track is composed of segments containing a pit region and a data region, wobble pits for sampling servo are formed in the pit region, grooves and lands are formed in the data region, and the grooves are used as recording tracks.

In order to achieve the above-mentioned object, a method of the present invention for producing a magneto-optical recording medium having the above-mentioned configuration includes: irradiating a light beam between the recording tracks of the magneto-optical recording medium, thereby making the magnetic anisotropy of at least one layer selected from the group consisting of the domain wall displacement layer and the recording layer formed between the recording tracks lower than that of said layers on the recording tracks; and applying a bias magnetic field while irradiating the light beam at least between the recording tracks.

According to the production method of the present invention, because of the application of a bias magnetic field, the perpendicular magnetic anisotropy between recording tracks can be reduced effectively, and a magnetic interaction with respect to the recording track can be decreased. Furthermore, the application of a bias magnetic field also can be used for initializing recording tracks. More specifically, magnetization of the recording layer may be aligned in a predetermined direction in a width direction in at least a part of the recording tracks by applying a bias magnetic field.

In the above-mentioned production method, specifically, a light beam focused to be smaller than a light beam for reproduction may be radiated between the recording tracks.

In the above-mentioned production method, it is preferable that a bias magnetic field is applied perpendicularly to a film surface. In this case, an application direction of a bias magnetic field may be the same between all the recording tracks. However, when the application direction is reversed at each recording track or at every other recording track, an effect of a leakage magnetic field can be reduced. In the above-mentioned production method, a bias magnetic field may be applied in an extension direction of the recording tracks in parallel with a film surface.

In the above-mentioned production method, a bias magnetic field to be applied may be 150 Oe or more. Furthermore, a light beam focused by an objective lens with a numerical aperture of 0.65 or more may be radiated between the recording tracks.

In order to achieve the above-mentioned object, according to the present invention, an apparatus for producing a magneto-optical recording medium having the above-mentioned configuration is provided. The production apparatus includes a light beam irradiation apparatus for irradiating a light beam between recording tracks of the magneto-optical recording medium; a magnetic field application apparatus for applying a bias magnetic field at least between the recording tracks while irradiating the light beam; and a magnetic field control apparatus for changing a direction of the bias magnetic field.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of an embodiment with reference to the drawings.

Figure 1:
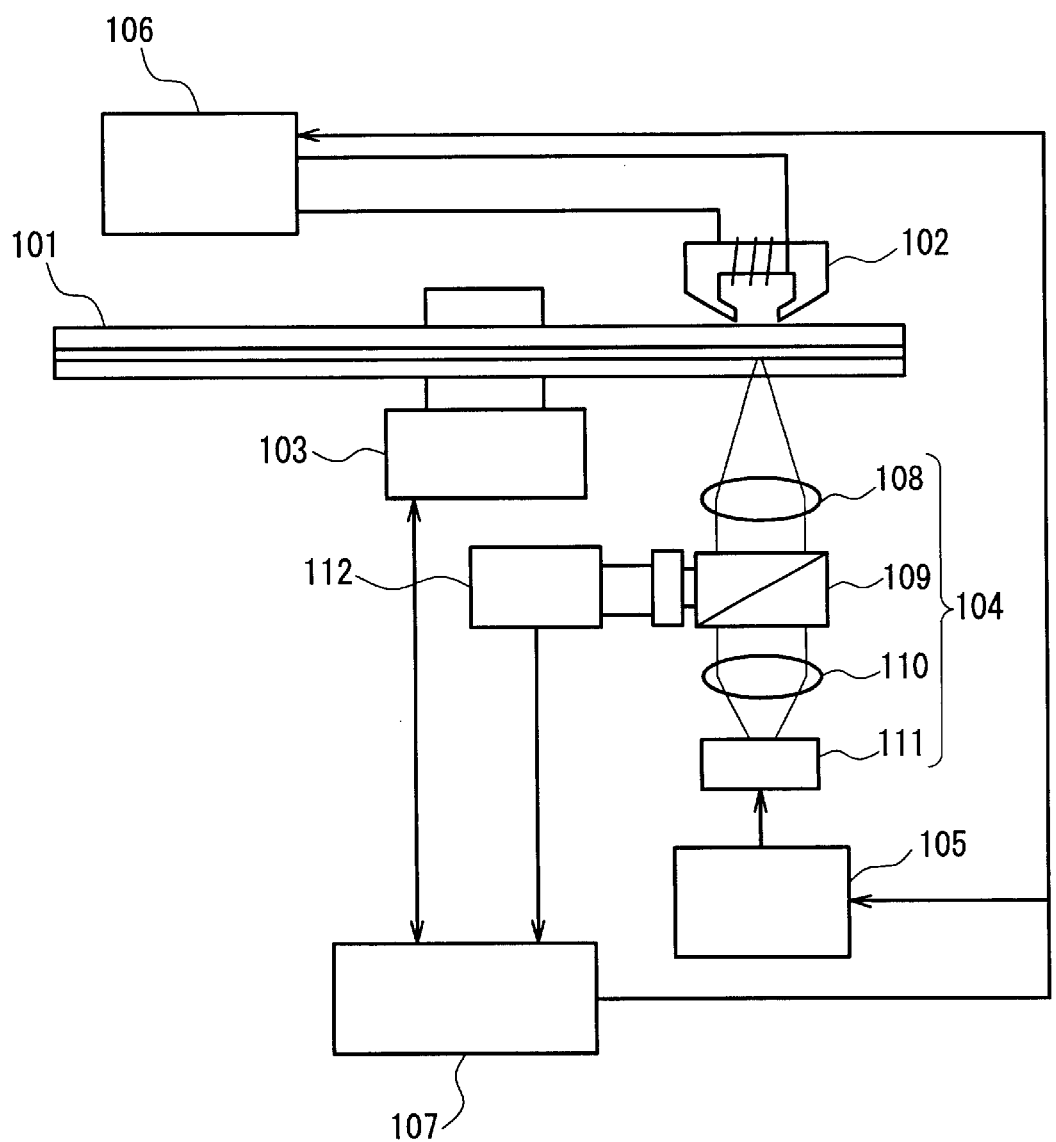
FIG. 1 shows an example of a configuration of an annealing apparatus used for carrying out the present invention.

FIG. 1 shows a configuration of an optical annealing apparatus of one embodiment according to the present invention.

In FIG. 1, reference numeral 101 denotes a magneto-optical recording medium (hereinafter, referred to as a "magneto-optical disk"), 102 denotes a magnetic head for applying a magnetic field to the magneto-optical disk 102, and 103 denotes a spindle motor for rotating the magneto-optical disk 101, which is controlled by a control circuit 107. Reference numeral. 104 denotes an optical head for subjecting the magneto-optical disk 101 to annealing. The magnetic head 102 and the optical head 104 are controlled by a magnetic head driving circuit 106 and a laser driving circuit 105, respectively.

As shown in FIG. 1, in the optical head 104, laser light emitted from a semiconductor laser light source 111 is collimated by a collimator lens 110. The parallel light thus obtained is incident upon an objective lens 108 through a polarized beam splitter 109, and focused onto a magnetic layer of the magneto-optical disk 101 by the objective lens 108 to form a light spot. Light reflected from the magneto-optical disk 101 passes through the objective lens 108, and is incident upon the polarized beam splitter 109. The light reflected from the beam splitter 109 is incident upon a detection circuit 112 to detect a control signal for tracking/focusing of the optical head 104.

When annealing is conducted, the optical head 104 is moved to the outermost side or the innermost side of the magneto-optical disk 101. The optical head 104 irradiates the magneto-optical disk 101 with a light spot, and the detection circuit 112 detects a control signal for focusing from light reflected from the magneto-optical disk 101, whereby focusing control is conducted. Then, the control signal for tracking is provided with an offset, whereby a light spot is allowed to scan a track to be annealed. Laser light is provided with a power intensity that achieves a high temperature to such a degree that the perpendicular magnetic anisotropy between recording tracks (information tracks) becomes weak. In the course of annealing, while the magnetic head 102 disposed so as to be opposed to the optical head 104 via the magneto-optical disk 101 is kept in contact with or disposed close to the magneto-optical disk 101, a magnetic field simultaneously is applied to the vicinity of a region to which laser light is radiated.

Annealing in each embodiment described below was conducted using the above-mentioned apparatus. However, a tracking system, a film configuration, and the like are varied in the respective embodiments.

Embodiment 1

Figure 2:
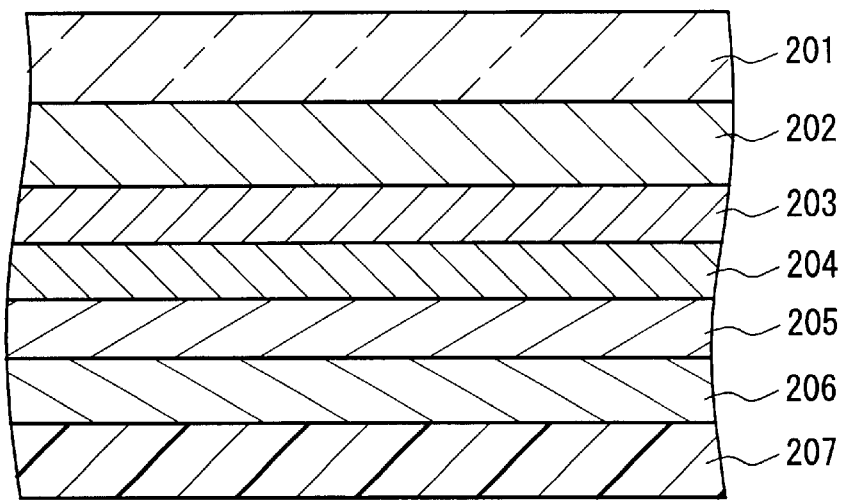
FIG. 2 is a cross-sectional view showing an example of a configuration of a magneto-optical recording medium of the present invention.

Referring to FIG. 2, an example of a method for producing a magneto-optical disk will be described.

Reference numeral 201 denotes a disk-shaped substrate, which can be made of polycarbonate, glass, or the like. Herein, the substrate 201 was obtained by injection-molding a polycarbonate material so that guide grooves (groove width: 0.6 $\mu$m, land width: 0.3 $\mu$m, depth: 55 nm) were formed for the purpose of conducting tracking during annealing. In this substrate, the track pitch is 0.9 $\mu$m. A first dielectric layer 202 and a second dielectric layer 206 can be made of, for example, a dielectric material such as $Si_3N_4$, AlN, $SiO_2$, SiO, ZnS, $MgF_2$, and $Ta_2O_5$ (each material is not limited to a composition determined by a stoichiometric ratio).

Hereinafter, an example of a method for forming each layer will be described.

Respective targets: Si doped with B, GdFeCo, TbFe, Fe, Co, AlTi, and Al were provided to a D.C. magnetron sputtering apparatus. A substrate was fixed with a substrate holder, and then, a chamber was evacuated to a high vacuum state of $1\times10^{-5}$ Pa or less with a cryopump. Under this condition, Ar gas was introduced into the chamber until a pressure of 0.3 Pa was obtained. While the substrate was being rotated, the following layers were formed successively. First, a SiNx layer (first dielectric layer) 202 was formed in a thickness of 80 nm. Then, GdFeCoAl (Curie temperature $T_{C1}$=260° C.) was formed in a thickness of 40 nm as a first magnetic layer (reproducing layer (domain wall displacement layer)) 203. TbFeAl ($T_{C2}$=150° C.) was formed in a thickness of 10 nm as a second magnetic layer (intermediate layer (switching layer)) 204. TbFeCo ($TC_3$= 300° C.) was formed in a thickness of 80 nm as a third magnetic layer (recording layer) 205. A SiNx layer was formed in a thickness of 50 nm as a second dielectric layer 206. During formation of the SiNx layer, $N_2$ gas was introduced in addition to Ar gas, whereby the SiNx layer was formed by D.C. reactive sputtering. Each magnetic layer was formed by applying a D.C. power to each target of GdFeCo, TbFe, Fe, Co, AlTi, and Al. Furthermore, the dielectric layer 206 was coated with a UV-curable resin, and the resin was cured to form a protective coating 207.

Figure 3:
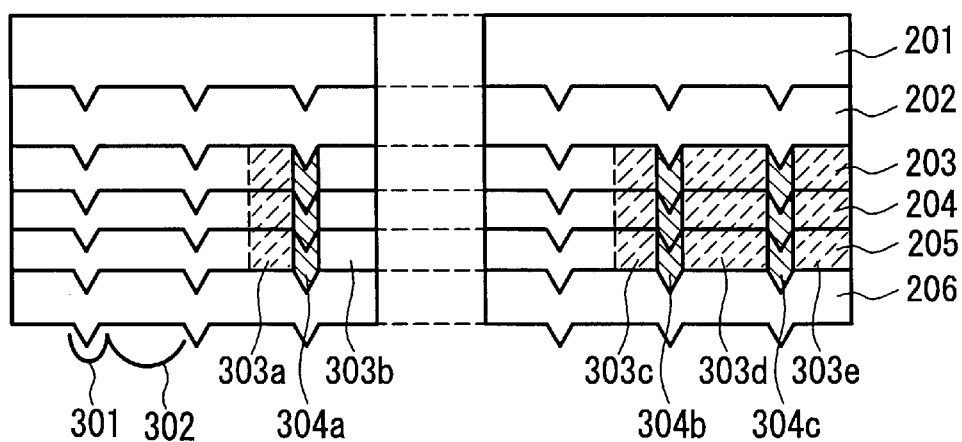
FIG. 3 is a cross-sectional view of a magneto-optical recording medium produced according to one embodiment of the present invention.

An example of the simultaneous initialization of a magneto-optical disk will be described with reference to FIGS. 1 and 3. FIG. 3 is an enlarged schematic view showing a cross-section of the magneto-optical disk 101 taken along a radial direction. Reference numerals 301 and 302 denote lands and grooves (recording tracks (information tracks)), respectively. In regions (lands) 304a to 304c, a magnetic interaction is weakened due to irradiation with a high-output laser.

In the initializing apparatus used in the present embodiment, laser light (wavelength: 650 nm) emitted from the semiconductor laser light source 111 passes through the polarized beam splitter 109, and is focused by the objective lens (NA: 0.85) 108 to form a laser spot. At this time, while the magnetic head 102 was kept in contact with the magneto-optical disk 101, a magnetic field of 150 Oe was applied in a direction perpendicular to a film surface. The application direction of the magnetic field was set in a predetermined direction. In this initializing apparatus, the objective lens 108 has a NA of 0.85. Therefore, a laser spot becomes smaller than that (diameter: 600 nm) of a general laser light for reproduction, and the diameter of the laser spot becomes 380 nm. Light reflected from the laser spot is detected by the detection circuit 112 via the objective lens 108 and the polarized beam splitter 109. Based on this detection signal, a focus actuator is driven so that the diameter of the laser spot does not change significantly.

Initialization of the magneto-optical disk 101 is conducted by irradiating laser light to a region between two recording tracks adjacent to each other in a radial direction to anneal the region. More specifically, the laser control circuit 105 controls laser light so that a laser spot scans the land 301. At this time, the laser spot is moved at an appropriate linear velocity with respect to the magneto-optical disk 101, using the spindle motor 103 of the magneto-optical disk 101 and a mechanism (not shown) for moving the laser spot in a radial direction of the magneto-optical disk 101. Due to the irradiation with laser light, annealing regions 304a to 304c are formed. In the annealing regions 304a to 304c, the reproducing layer 203, the intermediate layer 204, and the recording layer 205 are heated, magnetic anisotropy thereof is lowered, and magnetization thereof becomes different from that of the peripheral region, whereby magnetic coupling is cut off. In the annealing regions 304a to 304c, the magnetization of the recording layer 205 having the largest coercive force is in a perpendicular direction although perpendicular magnetic anisotropy is weakened, whereas the magnetization of the reproducing layer 203 having a small anisotropy is in an in-plane direction (in-plane magnetic film). In the case where an output laser power of the semiconductor laser light source 111 was 50 mW, the width of the annealing regions 304a to 304c was allowed to be set at 0.3 μm at a linear velocity of 20 m/sec.

As shown in FIG. 3, the lands 301 annealed by high-output laser light become annealing regions 304a to 304c, and the perpendicular magnetic anisotropy thereof is decreased. When the perpendicular magnetic anisotropy of the annealing region 304a is weakened, a magnetic interaction between the annealing region 304a and recording tracks 303a, 303b adjacent to the annealing region 304a can be cut off.

When laser light is radiated to the land 301, the temperature of magnetic layers in the groove 302 adjacent to the annealed land 301 also rises due to heat conduction. When the magnetic layers in this region are allowed to reach a Curie temperature, due to an external magnetic field applied from the magnetic head 102, polarized regions 303a to 303e are formed in the grooves 302. In the polarized regions 303a to 303e, magnetization is aligned in a direction in which a magnetic field is applied. When at least a half of a groove width (0.6 μm) in the adjacent groove is polarized by irradiation to the land, the entire region of the recording track can be initialized due to laser light radiated to the land.

As described above, in the present embodiment, annealing is conducted while a magnetic field is applied in one direction, whereby the perpendicular magnetic anisotropy of the land is lowered, and a magnetic interaction between the land and the groove to be a recording track can be weakened.

Furthermore, initialization for polarizing all the grooves in one direction can be conducted simultaneously. Because of this, an initialized magneto-optical disk with a high recording density can be obtained in a short period of time.

The configuration of the magneto-optical disk 101 is not limited to that shown in FIG. 2. It further may include a heat conduction adjusting layer or the like for adjusting the sensitivity of the recording layer 205 between the second dielectric layer 206 and the protective coating 207. As the heat conduction adjusting layer, for example, a metal film made of aluminum or gold can be used. In general, the thickness of the heat conduction adjusting layer preferably is about 50 to 500 nm.

Embodiment 2

Figure 4:
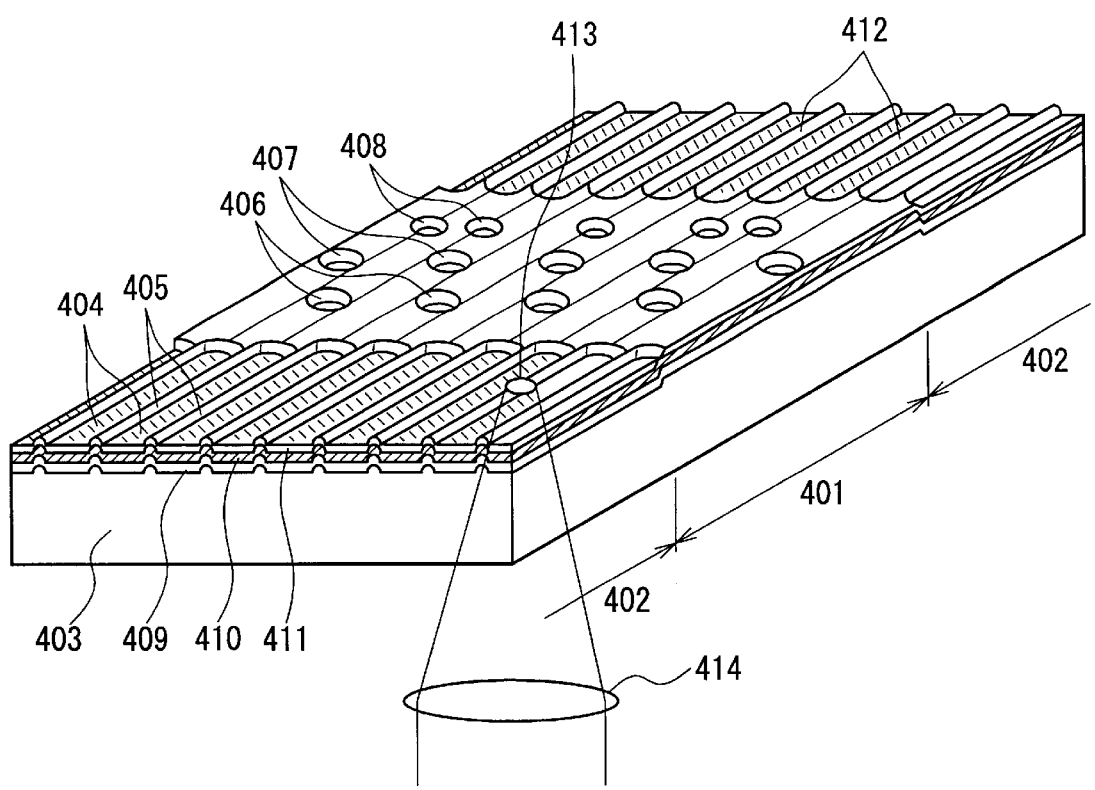
FIG. 4 is a partially cut-away perspective view of a magneto-optical recording medium produced according to one embodiment of the present invention.
Figure 5:
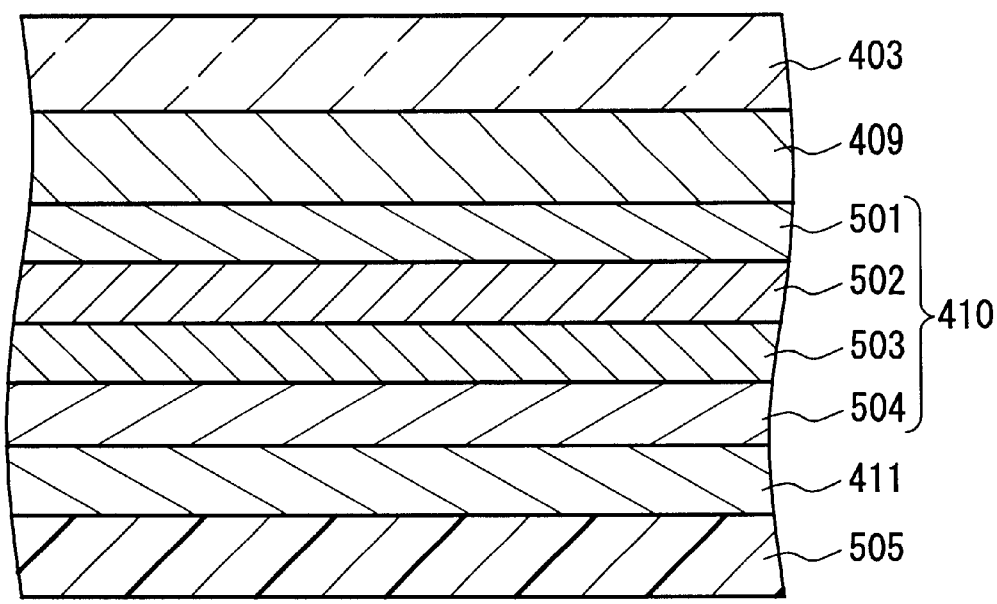
FIG. 5 is a cross-sectional view showing another example of a configuration of a magneto-optical recording medium of the present invention.

FIG. 4 is a partially cut-away perspective view of a magneto-optical disk of Embodiment 2, and FIG. 5 shows a film configuration thereof. Reference numeral 403 denotes a disk-shaped substrate, which can be made of polycarbonate, glass, or the like. Herein, the substrate 403 was obtained by injection-molding a polycarbonate material so that first wobble pits 406, second wobble pits 407, and address pits 408 were formed in a pit region 401 for the purpose of using a sampling servo system for tracking during recording/reproducing of information, and guide grooves (groove width: 0.5 μm, land width: 0.15 μm, depth: 55 nm) were formed in a groove region (data region) 402 for the purpose of conducting tracking during annealing. A first dielectric layer 409 and a second dielectric layer 411 can be made of the same dielectric material as the above.

Hereinafter, an example of a method for forming each layer will be described.

Respective targets: Si doped with B, GdFeCo, TbFe, Fe, Co, AlTi, Al, ZnS, and DyFeCo were provided to a D.C. magnetron sputtering apparatus. A substrate was fixed with a substrate holder, and then, a chamber was evacuated to a high vacuum state of $1\times10^{-5}$ Pa or less with a cryopump. Under this condition, Ar gas was introduced into the chamber until a pressure of 0.3 Pa was obtained. While the substrate was being rotated, the following layers were formed successively. First, a SiNx layer (first dielectric layer) 409 was formed in a thickness of 80 nm. Then, GdFeCo (Curie temperature $T_{C1}$=290° C.) was formed in a thickness of 30 nm as a first magnetic layer (reproducing layer (domain wall displacement layer)) 501. TbFeCo ($T_{C2}$= 180°) was formed in a thickness of 5 nm as a second magnetic layer (control layer) 502. TbFeAl ($T_{C3}$=160° C.) was formed in a thickness of 10 nm as a third magnetic layer (intermediate layer (switching layer)) 503. DyFeCo ($T_{C4}$= 400° C.) was formed in a thickness of 60 nm as a fourth magnetic layer (recording layer) 504. ZnS was formed in a thickness of 50 nm as a second dielectric layer 411. During formation of the SiNx layer, $N_2$ gas was introduced in addition to Ar gas, whereby the SiNx layer was formed by D.C. reactive sputtering. Each magnetic layer was formed by applying a D.C. power to each target.

A driving force for displacing a domain wall in the reproducing layer 501 utilizes a temperature gradient on the forward side of laser light. Although a temperature gradient formed on the backward side of laser light is more gentle than that on the forward side thereof, a domain wall driving force is induced. The displacement of a domain wall on the backward side of laser light becomes noise of a reproducing signal. However, when the control layer 502 is provided as one of magnetic layers 410 to allow an interface domain wall between the reproducing layer 501 and the recording layer 503 to be maintained easily, displacement of a domain wall on the backward side of laser light can be suppressed. As the control layer 502, a magnetic layer having a Curie temperature higher than that of the intermediate layer 503 and lower than that of the reproducing layer 501 is preferable.

A protective coating 505 was formed after annealing the lands. The protective coating 505 was formed by applying UV-curable resin, followed by curing it, in the same way as in the above.

Annealing in the present embodiment will be described with reference to FIG. 1. Herein, laser light emitted from the semiconductor laser light source (wavelength: 405 nm) 111 passes through the polarized beam splitter 109, and is focused by the objective lens (NA: 0.75) 108 to form a laser spot. At this time, while the magnetic head 102 was kept in contact with the magneto-optical disk 101, a magnetic field of 300 Oe was applied to the magneto-optical disk 101 in one direction (direction perpendicular to a film surface). In this initializing apparatus, laser light with a-wavelength of 405 nm is used. Therefore, the diameter of a laser spot 413 (FIG. 4) formed by condensing the laser light by the objective lens 414 becomes small (i.e., 300 nm).

By operating a tracking servo with the use of primary diffracted light from a land, the laser spot 413 was allowed to scan a land 405 with a width of 0.15 μm. Light reflected from the laser spot 413 is detected by the detection circuit 112 via the objective lens 108 and the polarized beam splitter 109. A focus actuator is driven based on the detected signal so that the diameter of the laser spot 413 is not changed largely.

Thus, the land 405 in the groove region (data region) 402 was irradiated with the above-mentioned high-output laser light. At this time, the laser spot 413 is moved at an appropriate linear velocity with respect to the magneto-optical disk 101, using the spindle motor 103 of the magneto-optical disk 101 and a mechanism (not shown) for moving the laser spot 413 in a radial direction of the magneto-optical disk 101. Due to the irradiation with laser light, initialization for forming annealing regions 412 is conducted. In the annealing regions 412, the reproducing layer 501, the control layer 502, the intermediate layer 503, and the recording layer 504 are heated and magnetization thereof becomes different from that of the peripheral region, whereby magnetic coupling is cut off. In the case where an output laser power of the semiconductor laser light source 111 was 20 mW, the width of the annealing regions 412 was allowed to be set at 0.16 μm at a linear velocity of 30 m/sec.

By allowing the laser spot 413 to scan the land 405, the magnetic layers in the entire region of the adjacent groove 404 reached a Curie temperature, and by applying an external magnetic field, the magnetization of the groove region 402 to be a recording track was polarized in one direction (direction perpendicular to a film surface).

A disk A was produced by conducting the above-mentioned annealing while applying a bias magnetic field in one direction, and a disk B was produced by conducting the above-mentioned annealing without applying a bias magnetic field. Recording marks were recorded onto and reproduced from the groove region 402 of these disks. In an evaluating apparatus, a light source with a wavelength of 650 nm was used, and light was focused by an objective lens with a NA of 0.65. A bias magnetic field of 350 Oe was applied at a linear velocity of 1.5 m/sec. and a power of 2.5 mW by magnetic field modulation recording, whereby a recording mark (recording domain) with the maximum mark length of 0.2 μm in a film surface direction was formed on the recording layer. In order to evaluate polarization dependence during annealing, erasure before recording was not conducted. As a result, in the disk B, a CN ratio of 37 dB was observed, whereas in the disk A, a CN ratio of 42 dB was obtained.

As described above, in the present embodiment, an initialized magneto-optical disk with a high recording density can be obtained in a short period of time.

Embodiment 3

Figure 6:
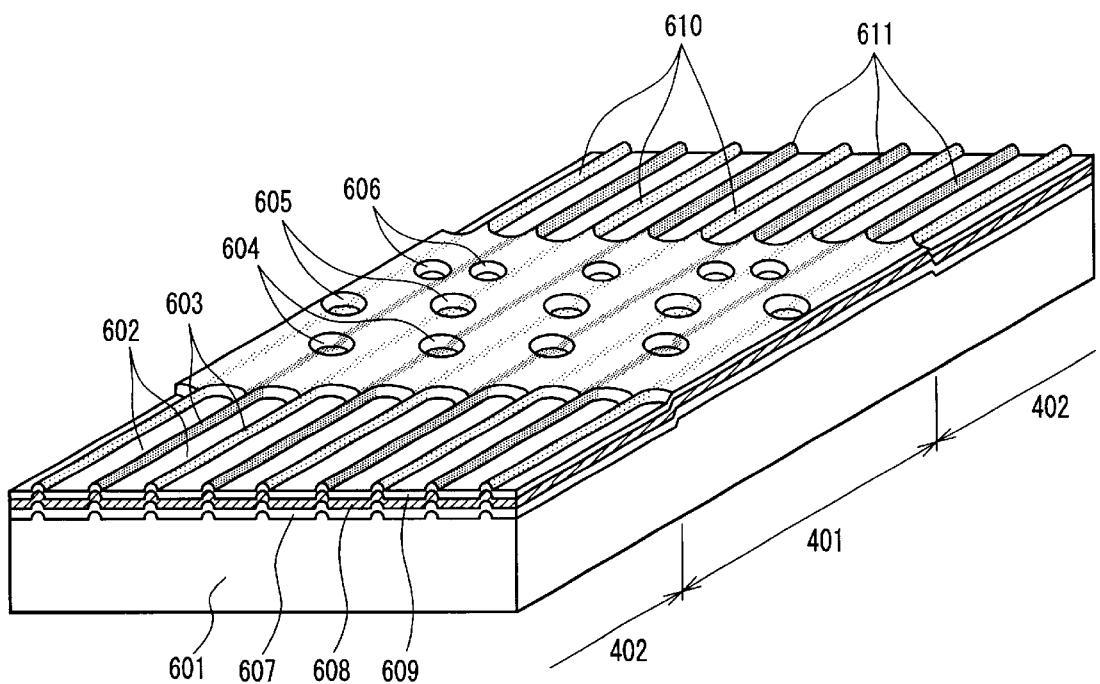
FIG. 6 is a partially cut-away perspective view showing a magneto-optical recording medium produced according to one embodiment of the present invention.
Figure 7A:
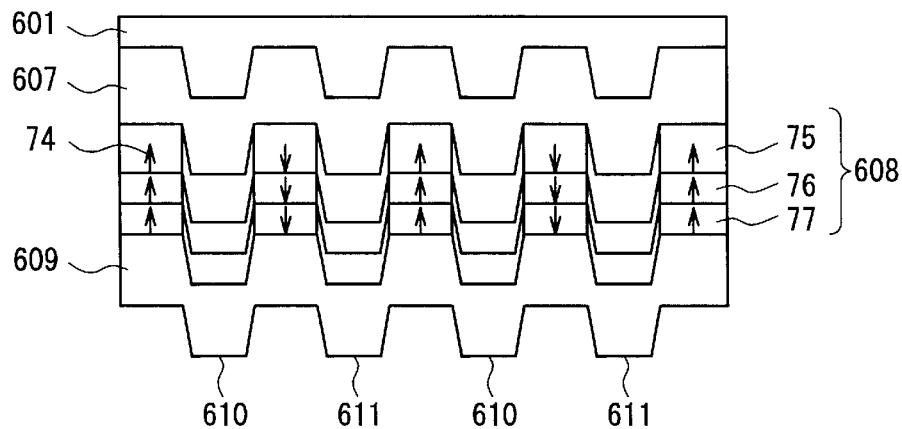
FIGS. 7A and 7B are an enlarged cross-sectional view and an enlarged plan view of a magneto-optical recording medium produced according to one embodiment of the present invention.
Figure 7B:
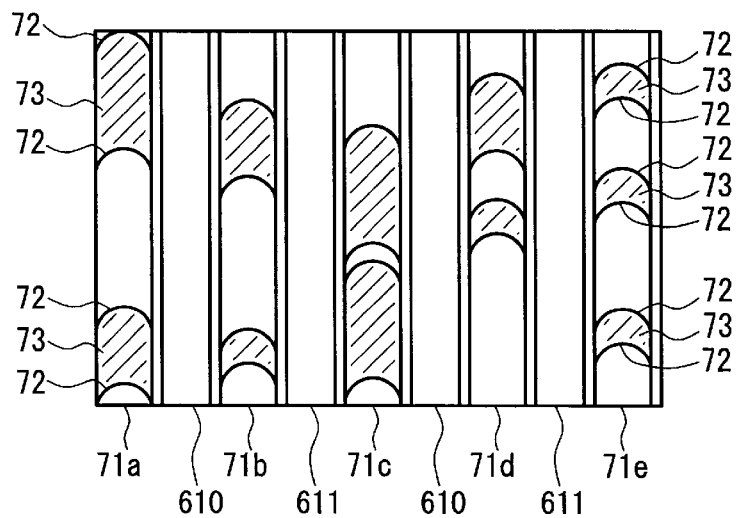

FIG. 6 is a partially cut-away perspective view of a magneto-optical disk of Embodiment 3, FIG. 7A is an enlarged cross-sectional view thereof, and FIG. 7B is an enlarged plan view thereof.

Reference numeral 601 denotes a disk-shaped substrate, which can be made of polycarbonate, glass, or the like. Herein, lands 603 between grooves 602 for recording information were annealed. The substrate 601 was obtained by injection-molding a polycarbonate material so that first wobble pits 604, second wobble pits 605, and address pits 606 were formed in a pit region 401 for the purpose of using a sampling servo system for tracking during recording/reproducing of information, and guide grooves (groove width: 0.4 μm, land width: 0.2 μm, depth: 75 nm) were formed in a groove region (data region) 402 for the purpose of conducting tracking during annealing. A first dielectric layer 607 and a second dielectric layer 609 can be made of the same dielectric material as the above.

Hereinafter, an example of a method for forming each layer will be described.

Respective targets: Si doped with B, GdFeCo, TbFe, Fe, Co, Cr, AlTi, Al, and ZnS were provided to a D.C. magnetron sputtering apparatus. A substrate was fixed with a substrate holder, and then, a chamber was evacuated to a high vacuum state of $1\times10^{-5}$ Pa or less with a cryopump. Under this condition, Ar gas was introduced into the chamber until a pressure of 0.3 Pa was obtained. While the substrate was being rotated, the following layers were formed successively. First, a SiNx layer (first dielectric layer) 607 was formed in a thickness of 80 nm. Then, GdFeCoSi (Curie temperature $T_{C1}=250°$ C.) was formed in a thickness of 45 nm as a first magnetic layer (reproducing layer (domain wall displacement layer)) 75. TbFeCr ($T_{C2}=90°$) was formed in a thickness of 15 nm as a second magnetic layer (intermediate layer) 76. TbFeCoAl ($T_{C3}=270°$ C.) was formed in a thickness of 100 nm as a third magnetic layer (recording layer) 77. ZnS was formed in a thickness of 50 nm as a second dielectric layer 609. During formation of the SiNx layer, $N_2$ gas was introduced in addition to Ar gas, whereby the SiNx layer was formed by D.C. reactive sputtering. Each magnetic layer was formed by applying a D.C. power to each target.

Annealing in the present embodiment will be described with reference to a schematic view of the initializing apparatus in FIG. 1. Herein, an initializing apparatus provided with a semiconductor laser light source (wavelength: 450 nm) 111 and an objective lens (NA: 0.65) 108 was used. A laser tracking system is the same as described in the initializing system of Embodiment 2.

In the present embodiment, during annealing, a magnetic field of ±400 Oe was applied perpendicularly to a film surface of the magnetic layers while the magnetic head 102 was kept in contact with the magneto-optical disk 101. The application direction of a magnetic field was controlled by the control circuit 107 through the magnetic head driving circuit 106 so that the application direction was reversed with every one rotation of the spindle motor 103. When the application direction of a magnetic field is reversed with every one rotation, the groove 602 is disposed adjacent to both the land 610 in which a magnetic field is applied upward and the land 611 in which a magnetic field is applied downward.

In the present embodiment, initialization was conducted by irradiating the lands 603 in the groove region 402 with high-output laser light. At this time, a laser spot is moved at an appropriate linear velocity with respect to the magneto-optical disk 101, using the spindle motor 103 of the magneto-optical disk 101 and a mechanism (not shown) for moving the laser spot in a radial direction of the magneto-optical disk 101. Due to the irradiation with laser light, annealing regions are formed. In the annealing regions, the reproducing layer 75, the intermediate layer 76, and the recording layer 77 are heated and the magnetization thereof becomes different from that of the peripheral region, whereby magnetic coupling is cut off. In the case where an output laser power of the semiconductor laser light source 111 was 25 mW, the width of the annealing regions was allowed to be set at 0.22 μm at a linear velocity of 40 m/sec.

FIGS. 7A and 7B show that recording marks are formed in the grooves 602 of the magneto-optical disk thus initialized. In a recording/reproducing apparatus, a light source with a wavelength of 650 nm was used, and light was focused by an objective lens with a NA of 0.65. A linear velocity of 1.5 m/sec. and a power of 2.0 mW were adopted, and recording was conducted while applying a magnetic field of 350 Oe at a recording power of 3.0 mW by magnetic field modulation recording.

FIG. 7A is an enlarged cross-sectional view of the magneto-optical disk in the groove region 402 taken along a radial direction, and FIG. 7B is an enlarged plan view thereof. On the respective sides of recording tracks 71a to 71e (grooves 602), the land 610 in which a magnetic field is applied upward and the land 611 in which a magnetic field is applied downward are disposed. Recording marks 73 are formed in the recording layer 77 in the magnetic layers 608. In FIGS. 7A and 7B, reference numeral 74 denotes a magnetization direction of each magnetic layer, and 72 denotes a domain wall. The domain wall 72 is formed at a boundary of the recording mark 73, in which a magnetization direction is twisted locally.

Although magnetic coupling with respect to an adjacent track is weakened by irradiation with a high-output laser during annealing, the magnetic characteristics of the annealed track are not eliminated completely. Particularly, in the DWDD magnetic layers 608, a magnetic film having a Curie temperature higher than those of the other magnetic layers and large perpendicular magnetic anisotropy is used for the recording layer 77. Therefore, even after the irradiation with a high output laser, it is difficult to eliminate the perpendicular magnetic anisotropy of the recording layer 77 completely. If annealing for completely eliminating perpendicular magnetic anisotropy of the recording layer 77 in a track adjacent to a recording track, the magnetic properties of the recording tracks 71a to 71e also are degraded, so that a satisfactory reproducing signal cannot be obtained.

Figure 8A:
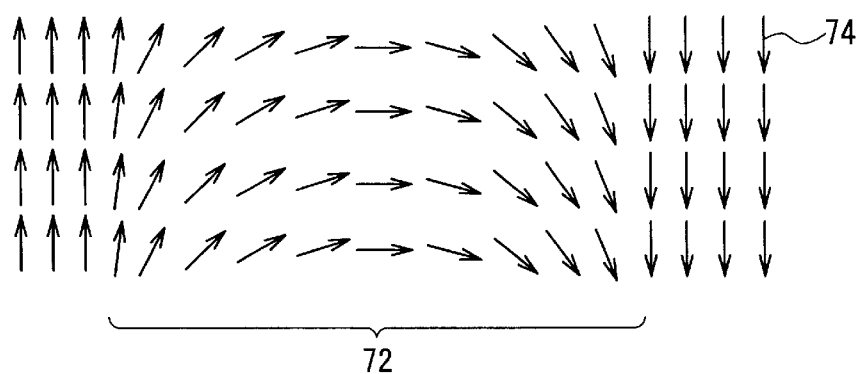
FIGS. 8A and 8B schematically show examples of a configuration of a domain wall of a magneto-optical recording medium of the present invention.
Figure 8B:
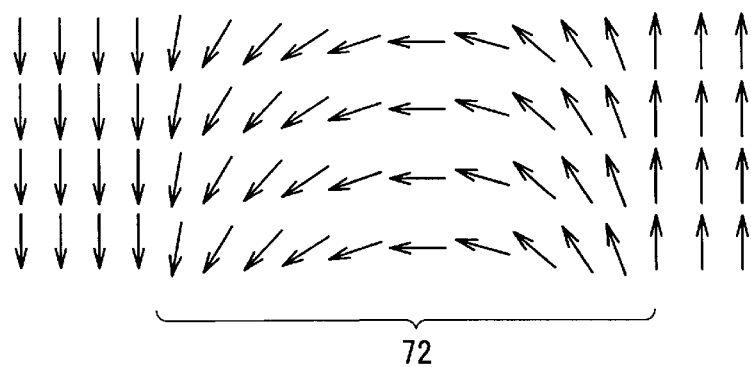
Figure 9:
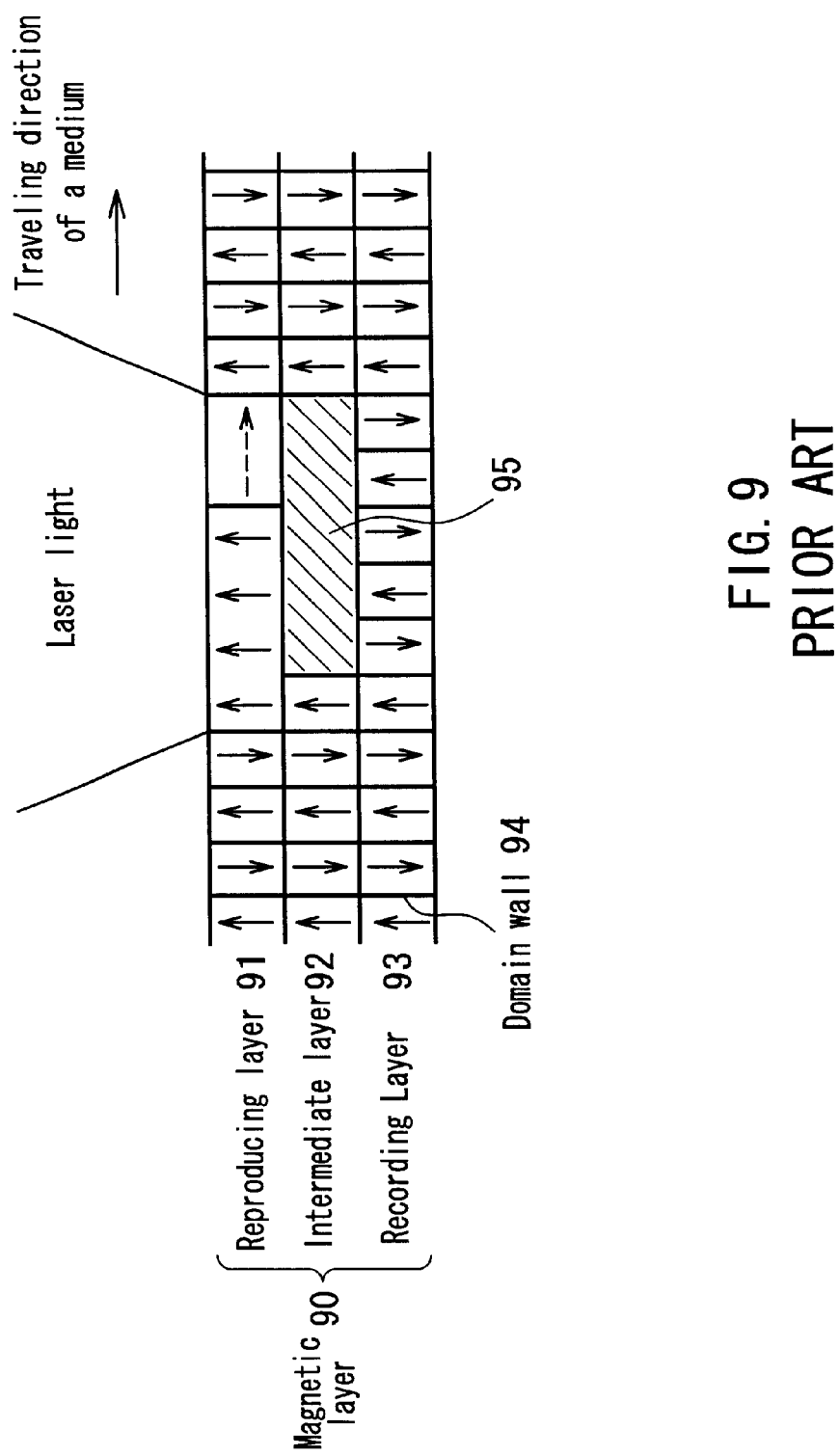
FIG. 9 is a cross-sectional view showing an example of a conventional magneto-optical recording medium used in a DWDD reproducing system.

A leakage magnetic field from an adjacent track to the reproducing layer 75 of a recording track influences the displacement of a domain wall in the reproducing layer 75, in the case where the reproducing layer 75 is not exchange-coupled to the recording layer 77. FIGS. 8A and 8B are enlarged views showing two types of domain walls, using a magnetization direction 74. For example, the case will be considered in which an upward leakage magnetic field is applied from an adjacent track, and it is attempted to displace a domain wall 72 from the left side to the right side in the figure. In FIG. 8A, due to the displacement of the domain wall, an area of an upward magnetization direction is enlarged. However, if an area of an upward magnetization direction is enlarged, the magnetostatic energy becomes high. Therefore, a domain wall becomes more unlikely to be displaced, compared with the case where there is no leakage magnetic field. On the other hand, in FIG. 8B, when a domain wall is displaced to the right side in the figure, an area of a downward magnetization direction is enlarged. If an area of a downward magnetization direction is enlarged, the magnetostatic energy becomes low. Therefore, a domain wall becomes likely to be displaced compared with the case where there is no leakage magnetic field. In the case where a downward leakage magnetic field is applied from an adjacent track, contrary to the above, the domain wall in FIG. 8A becomes likely to be displaced compared with the domain wall in FIG. 8B.

When the mobility of a domain wall is varied depending upon the configuration of the domain wall 72 formed at the boundary of the recording mark 73, a reproducing signal is adversely affected. However, as in the present embodiment, when two tracks adjacent to the recording track 71 are supplied with magnetic fields in opposite directions, it becomes substantially possible to eliminate the influence of a leakage magnetic field on the recording track 71. Therefore, a satisfactory DWDD signal can be obtained.

In the present embodiment, the lands 603 are annealed by applying magnetic fields in opposite directions alternately at every track, whereby a leakage magnetic field generated in the recording track 71 is decreased. However, a leakage magnetic field generated in the recording track 71 may be decreased by applying a high-frequency (e.g., about 10 to 30 MHz) reversed magnetic field to the lands.

As described above, in Embodiment 3, an initialized magneto-optical disk with a high recording density, in which a further satisfactory DWDD signal is obtained, can be produced in a short period of time.

Embodiment 4

Figure 10:
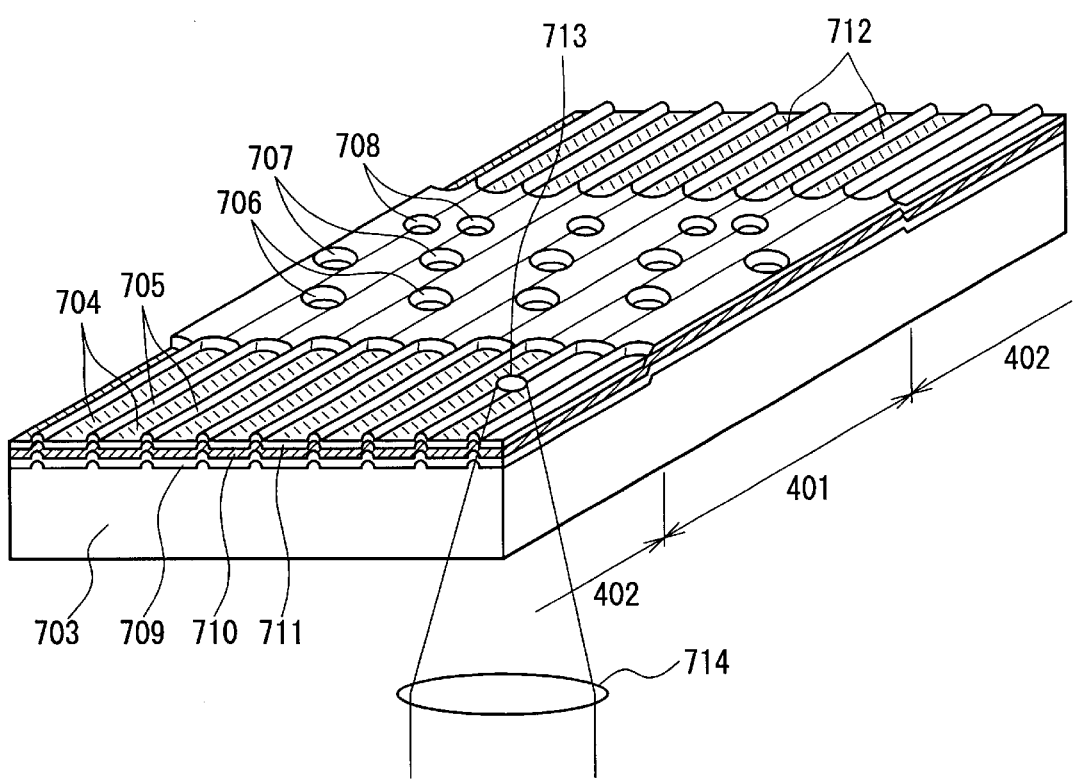
FIG. 10 is a partially cut-away perspective view showing a magneto-optical recording medium produced according to one embodiment of the present invention.
Figure 11A:
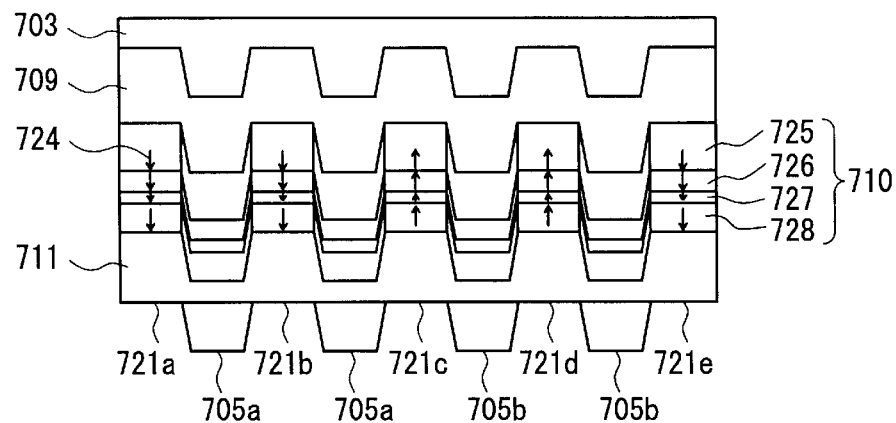
FIGS. 11A and 11B are an enlarged cross-sectional view and an enlarged plan view of a magneto-optical recording medium produced according to one embodiment of the present invention.
Figure 11B:
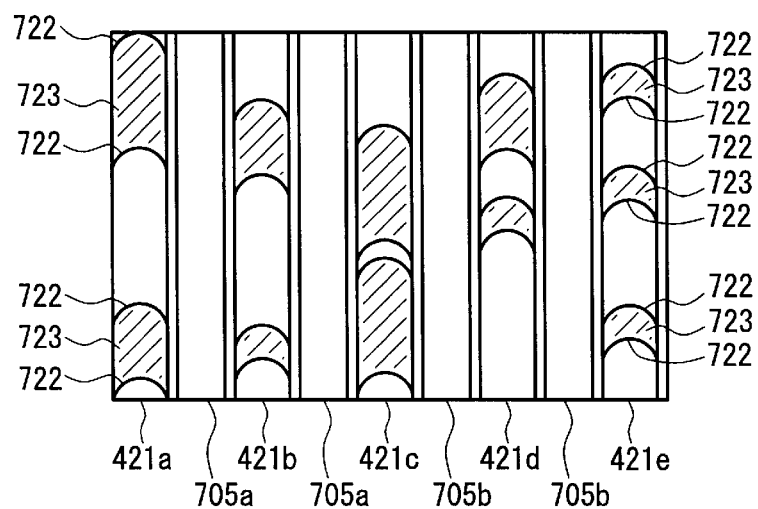

FIG. 10 is a partially cut-away perspective view of a magneto-optical disk of Embodiment 4, FIG. 11A is an enlarged cross-sectional view thereof, and FIG. 11B is an enlarged plan view thereof.

Reference numeral 703 denotes a disk-shaped substrate, which can be made of polycarbonate, glass, or the like. Herein, lands 705 between grooves 704 for recording information were annealed. The substrate 703 was obtained by injection-molding a polycarbonate material so that first wobble pits 706, second wobble pits 707, and address pits 708 were formed in a pit region 401 for the purpose of using a sampling servo system for tracking during recording/reproducing of information, and guide grooves (groove width: 0.4 μm, land width: 0.15 μm, depth: 60 nm) were formed in a groove region (data region) 402 for the purpose of conducting tracking during annealing. A first dielectric layer 709 and a second dielectric layer 711 can be made of the same dielectric material as the above.

Hereinafter, an example of a method for forming each layer will be described.

Respective targets: Si doped with B, GdFeCo, TbFe, Fe, Co, Cr, AlTi, Ta, and DyFeCo were provided to a D.C. magnetron sputtering apparatus. A substrate was fixed with a substrate holder, and then, a chamber was evacuated to a high vacuum state of $1\times10^{-5}$ Pa or less with a cryopump. Under this condition, Ar gas was introduced into the chamber until a pressure of 0.3 Pa was obtained. While the substrate was being rotated, the following layers were formed successively. First, a SiNx layer (first dielectric layer) 709 was formed in a thickness of 80 nm. Then, GdFeCoCr (Curie temperature $T_{C1}$=270° C.) was formed in a thickness of 35 nm as a first magnetic layer (reproducing layer (domain wall displacement layer)) 725. TbFeCr ($T_{C2}$=130° C.) was formed in a thickness of 5 nm as a second magnetic layer (control layer) 726. TbFe ($T_{C3}$=100° C.) was formed in a thickness of 10 nm as a third magnetic layer (intermediate layer) 727. TbDyFeCo ($T_{C3}$=280° C.) was formed in a thickness of 600 nm as a fourth magnetic layer 728 (recording layer). TaOx was formed in a thickness of 60 nm as a second dielectric layer 711. During formation of the SiNx layer, $N_2$ gas was introduced in addition to Ar gas, and during formation of the TaOx layer, $O_2$ gas was introduced in addition to Ar gas, whereby the SiNx layer and the TaOx layer were formed by D.C. reactive sputtering. Each magnetic layer was formed by applying a D.C. power to each target.

Annealing in the present embodiment will be described with reference to a schematic view of the initializing apparatus in FIG. 1. Herein, an initializing apparatus provided with a semiconductor laser light source (wavelength: 410 nm) 111 and an objective lens (NA: 0.65) 108 was used. A laser tracking system is the same as described in the initializing system of Embodiment 2.

In the present embodiment, during annealing, a magnetic field of ±200 Oe was applied perpendicularly to a film surface of the magnetic layers while the magnetic head 102 was kept in contact with the magneto-optical disk 101. The application direction of a magnetic field was controlled by the control circuit 107 through the magnetic head driving circuit 106 so that the application direction was reversed with every other rotation of the spindle motor 103. When the lands are annealed successively in a radial direction while the application direction of a magnetic field is reversed with every other rotation, grooves 721a, 721b, and 721e magnetized downwardly due to the magnetization of the land 705a in which a magnetic field is applied downward and grooves 721c and 721d magnetized upwardly due to the magnetization of the land 705b in which a magnetic field is applied upwardly are arranged alternately at every other groove in a radial direction.

In the present embodiment, initialization was conducted by irradiating the lands 705 in the groove region (data region) 402 with high-output laser light. At this time, the laser spot is moved at an appropriate linear velocity with respect to the magneto-optical disk 101, using the spindle motor 103 of the magneto-optical disk 101 and a mechanism (not shown) for moving the laser spot 713 in a radial direction of the magneto-optical disk 101. Due to the irradiation with laser light, initialization for forming annealing regions 712 is conducted. In the annealing regions 712, the reproducing layer 725, the control layer 726, the intermediate layer 727, and the recording layer 728 are heated and the magnetization thereof becomes different from that of the peripheral region, whereby magnetic coupling is cut off. In the case where an output laser power of the semiconductor laser light source 111 was 27 mW, the width of the annealing region 712 was allowed to be set at 0.19 μm at a linear velocity of 10 m/sec. As a result, the perpendicular magnetic anisotropy is decreased substantially over the entire region of the lands 705, whereby an in-plane film magnetically cutting off a region between grooves is formed. The reason for this is as follows: the temperature of the lands 705 is increased during annealing and magnetic degradation is caused, which lowers perpendicular magnetic anisotropy to direct magnetization in an in-plane direction. On the other hand, the grooves 704 are away from the center of laser light to be radiated. Therefore, a perpendicular film is maintained; however, the temperature of the recording layer also reaches a Curie temperature, and consequently, a magnetization direction is aligned in a direction of an applied magnetic field. Similarly, in the reproducing layer in which magnetization in a perpendicular direction is maintained, its magnetization becomes the same as that of the recording layer due to the exchange coupling with the recording layer.

FIGS. 11A and 11B show that recording marks are formed in the grooves 704 of the magneto-optical disk thus initialized. In a recording/reproducing apparatus, a light source with a wavelength of 650 nm was used, and light was focused by an objective lens with a NA of 0.65. A linear velocity of 2.4 m/s and a power of 2.2 mW were adopted, and recording was conducted while applying a magnetic field of 300 Oe at a recording power of 4.0 mW by magnetic field modulation recording.

FIG. 11A is an enlarged cross-sectional view of a magneto-optical disk in the groove region taken along a radial direction, and FIG. 11B is an enlarged plan view thereof. In FIGS. 11A and 11B, recording tracks 721a to 721e are disposed adjacent to every other track of the lands 705a in which a magnetic field is applied downwardly and to every other track of the lands 705b in which a magnetic field is applied upwardly. Recording marks 723 are formed in the recording tracks of the grooves. Reference numeral 724 denotes a magnetization direction of each magnetic layer with an arrow. Reference numeral 722 denotes a domain wall. The domain wall 722 is formed at the boundary of the recording mark 723, and its magnetization direction is twisted locally.

In the recording track, the domain wall 722 of the reproducing layer 725 is displaced during reproduction, whereby a minute mark of an optical limit or less is enlarged to obtain a satisfactory signal. In order to displace the domain wall 722 stably at a high speed, various conditions are considered.

One of the conditions is an influence of a leakage magnetic field generated from a recording track adjacent to a recording track. As in the present embodiment, when a magnetic effect of an adjacent land is weakened by irradiation with a high-output laser during annealing, the magnetic characteristics in a direction perpendicular to a film surface of the land that is a track subjected to annealing is substantially completely eliminated. However, since a track pitch is small, there is an influence of a leakage magnetic field from a groove that is an adjacent recording track. Particularly, in the DWDD magnetic film, a Curie temperature of the recording layer 728 is higher than that of the other magnetic layers. Therefore, in the case where the reproducing layer 725 of the recording tracks 721a to 721e is supplied with a leakage magnetic field from an adjacent recording track, in the reproducing layer 725 in which the intermediate layer 727 reaches a Curie temperature and exchange coupling is cut off, there is an influence on the displacement of a domain wall.

When the mobility of a domain wall is varied depending upon the configuration of the domain wall 722 formed at the boundary of the recording mark 723, a reproducing signal is adversely affected. In the present embodiment, magnetic fields in opposite directions are applied to every other groove (recording track) adjacent to the recording track 721, whereby each of the recording tracks 721a to 721e is interposed between an upwardly magnetized groove (recording track) and a downwardly magnetized groove (recording track). Thus, it becomes substantially possible to eliminate the influence of a leakage magnetic field from an adjacent groove generated in a groove that is a recording track.

In the present embodiment, the lands 705 are supplied with magnetic fields in opposite directions at every other track to conduct annealing, whereby a leakage magnetic field generated in the recording track 721 can be decreased.

In the same way as in the above, a leakage magnetic field generated in recording tracks may be decreased by applying a reversed magnetic field of a high frequency (e.g., about 10 to 30 MHz) to the groove.

Furthermore, in the present embodiment, a magneto-optical recording medium with a track pitch of 0.55 µm has been described. As a track pitch is decreased, the effect obtained from the configuration in which magnetization directions are reversed at every other track is increased.

As described above, in Embodiment 4, a magneto-optical disk with a high recording density, in which a satisfactory DWDD signal is obtained, can be produced without requiring initialization of a groove region.

Figure 12:
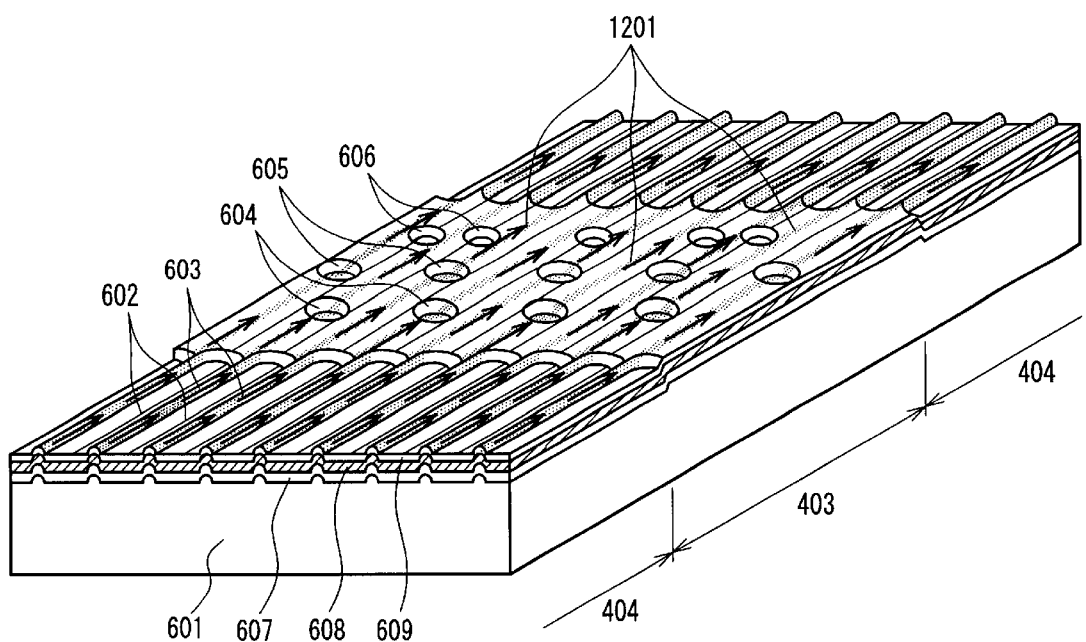
FIG. 12 is a partially cut-away perspective view of a magneto-optical recording medium produced according to one embodiment of the present invention.

The case where a bias magnetic field is perpendicular to a film surface has been described. The present invention is not limited thereto. When annealing is conducted in the same way as in Embodiment 3 while a bias magnetic field is applied in a traveling direction of a medium (extension direction of a recording track) in parallel with a film surface or while a bias magnetic field having a perpendicular component and a parallel component is applied, as shown in FIG. 12, a closed magnetic circuit is formed along a film surface in the annealing region 1201 containing lands. In this configuration, a leakage magnetic field from between the recording tracks that are annealing regions can be suppressed to a very low level. Therefore, a satisfactory DWDD operation can be realized. By applying a bias magnetic field having both a parallel component and a perpendicular component to a film surface, lands and grooves are magnetized in different directions, and initialization by polarization of grooves can be conducted simultaneously.

A bias magnetic field with a bias magnetic field intensity of 150 to 400 Oe has been described. However, if annealing is conducted while a bias magnetic field of 150 Oe or more is applied in accordance with a light spot diameter and a heating temperature of a magnetic film, similar effects can be obtained.

Furthermore, regarding the film configuration, a reproducing layer (domain wall displacement layer) with a thickness of 30 to 45 nm, an intermediate layer (switching layer) with a thickness of 10 to 15 nm, and a recording layer with a thickness of 60 to 100 nm has been described. These film thicknesses are shown merely for illustrative purpose. Therefore, the present invention is not limited thereto. Any film configuration may be used as long as a sufficient magnetic coupling force is obtained between the recording layer and the reproducing layer. Preferably, the reproducing layer and the recording layer have a thickness of 10 nm to 200 nm. Furthermore, another magnetic layer such as a recording assisting layer may be provided adjacent to the recording layer.

Furthermore, a protective coating may be provided on the second dielectric layer via a heat absorbing layer.

In the above-mentioned respective embodiments, an optical head with a laser wavelength of 405 to 650 nm and a NA of an objective lens of 0.65 to 0.85 has been described. An optical head may be appropriately selected in accordance with the width of a region to be annealed.

As described above, according to the present invention, by applying a magnetic field simultaneously while a region between recording tracks is being annealed, the magnetic anisotropy of the magnetic layer between the recording tracks is made lower than that of the magnetic layer on the recording track, and magnetic coupling between the recording tracks can be cut off effectively. Furthermore, initialization of a recording track also can be conducted. Thus, a magneto-optical recording medium is obtained, which has a high recording density, a large signal level, and a low noise. Furthermore, by controlling the application direction of a magnetic field during annealing, a leakage magnetic field from an adjacent track further can be suppressed, and a more satisfactory DWDD signal can be obtained. Furthermore, according to the present invention, it becomes possible to omit an initialization process of a data region.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magneto-optical recording medium, comprising a substrate and a multi-layer film formed on the substrate, the multi-layer film including a first dielectric layer, a domain wall displacement layer, a switching layer, a recording layer, and a second dielectric layer in this order from the substrate side, a Curie temperature of the switching layer being lower than those of the domain wall displacement layer and the recording layer, a domain wall in the domain wall displacement layer being displaced to a higher temperature side in a region that reaches a temperature equal to or higher than a Curie temperature of the switching layer due to irradiation with a light beam for reproduction, wherein magnetic anisotropy of at least one layer selected from the group consisting of the domain wall displacement layer and the recording layer formed between recording tracks is made lower than that of said layers on the recording tracks, and magnetization of at least one magnetic layer selected from the group consisting of the domain wall displacement layer, the switching layer, and the recording layer is aligned in a predetermined direction in a region that is a half or more of a track width in a track width direction in at least a part of the recording tracks.

2. A magneto-optical recording medium according to claim 1, wherein magnetization of at least the recording layer is aligned in the predetermined direction.

3. A magneto-optical recording medium according to claim 1, wherein magnetization is aligned perpendicularly to a film surface on the recording tracks.

4. A magneto-optical recording medium according to claim 1, wherein magnetization is aligned in parallel with a film surface between the recording tracks.

5. A magneto-optical recording medium according to claim 4, wherein magnetization is aligned in an extension direction of the recording tracks therebetween.

6. A magneto-optical recording medium according to claim 1, wherein magnetization is aligned in the predetermined direction on all the recording tracks.

7. A magneto-optical recording medium according to claim 1, wherein alignment directions of magnetization on the recording tracks are varied depending upon the recording tracks.

8. A magneto-optical recording medium according to claim 7, wherein the alignment directions are reversed at each track.

9. A magneto-optical recording medium according to claim 7, wherein the alignment directions are reversed at every other track.

10. A magneto-optical recording medium according to claim 1, wherein a pit and a groove are embossed on a substrate, and a track pitch of the recording tracks is 0.9 µm or less.

11. A magneto-optical recording medium according to claim 1, wherein the recording track is composed of segments containing a pit region and a data region, wobble pits for sampling servo are formed in the pit region, grooves and lands are formed in the data region, and the grooves are used as recording tracks.

12. A method for producing a magneto-optical recording medium including a substrate and a multi-layer film formed on the substrate, the multi-layer film including a first dielectric layer, a domain wall displacement layer, a switching layer, a recording layer, and a second dielectric layer in this order from the substrate side, wherein a Curie temperature of the switching layer is lower than those of the domain wall displacement layer and the recording layer, and a domain wall in the domain wall displacement layer is displaced to a higher temperature side in a region that reaches a temperature equal to or higher than a Curie temperature of the switching layer due to irradiation with a light beam for reproduction, the method comprising:

irradiating a light beam between the recording tracks of the magneto-optical recording medium, thereby making magnetic anisotropy of at least one layer selected from the group consisting of the domain wall displacement layer and the recording layer formed between the recording tracks lower than that of said layers on the recording tracks; and applying a bias magnetic field while irradiating the light beam at least between the recording tracks.

13. A method for producing a magneto-optical recording medium according to claim 12, wherein a bias magnetic field is applied so that magnetization of the recording layer is aligned in a predetermined direction in a width direction in at least a part of the recording tracks.

14. A method for producing a magneto-optical recording medium according to claim 12, wherein a light beam focused to be smaller than that of a light beam for reproduction is radiated between the recording tracks.

15. A method for producing a magneto-optical recording medium according to claim 12, wherein a bias magnetic field is applied perpendicularly to a film surface.

16. A method for producing a magneto-optical recording medium according to claim 15, wherein an application direction of a bias magnetic field between the recording tracks is reversed at each recording track or at every other recording track.

17. A method for producing a magneto-optical recording medium according to claim 12, wherein a bias magnetic field is applied in an extension direction of the recording tracks in parallel with a film surface.

18. A method for producing a magneto-optical recording medium according to claim 12, wherein the bias magnetic field is set to be 150 Oe or more.

19. A method for producing a magneto-optical recording medium according to claim 12, wherein a light beam focused by using an objective lens with a numerical aperture of 0.65 or more is radiated between the recording tracks.

20. An apparatus for producing a magneto-optical recording medium including a substrate and a multi-layer film formed on the substrate, the multi-layer film including a first dielectric layer, a domain wall displacement layer, a switching layer, a recording layer, and a second dielectric layer in this order from the substrate side, wherein a Curie temperature of the switching layer is lower than those of the domain wall displacement layer and the recording layer, and a domain wall in the domain wall displacement layer is displaced to a higher temperature side in a region that reaches a temperature equal to or higher than a Curie temperature of the switching layer due to irradiation with a light beam for reproduction, the apparatus comprising:

a light beam irradiation apparatus for irradiating a light beam between recording tracks of the magneto-optical recording medium;

a magnetic field application apparatus for applying a bias magnetic field at least between the recording tracks while irradiating the light beam; and a magnetic field control apparatus for changing a direction of the bias magnetic field.

* * * * *